US007185276B2

(12) United States Patent
Keswa

(10) Patent No.: US 7,185,276 B2
(45) Date of Patent: Feb. 27, 2007

(54) SYSTEM AND METHOD FOR DYNAMICALLY TRANSLATING HTML TO VOICEXML INTELLIGENTLY

(75) Inventor: Mduduzi Keswa, Newtown, PA (US)

(73) Assignee: Voxera Corporation, Langhorne, PA (US)

( * ) Notice: Subject to any disclaimer, the term of this patent is extended or adjusted under 35 U.S.C. 154(b) by 553 days.

(21) Appl. No.: 09/924,445

(22) Filed: Aug. 9, 2001

(65) Prior Publication Data

US 2004/0205614 A1    Oct. 14, 2004

(51) Int. Cl.
*G06F 17/21*    (2006.01)
*G06F 17/24*    (2006.01)
(52) U.S. Cl. ............... 715/513; 715/511; 715/512; 715/523; 715/747; 707/1; 707/10; 709/218; 709/224
(58) Field of Classification Search ........... 715/500, 715/500.1, 511–513, 523, 539, 747; 707/1, 707/10; 709/218, 224
See application file for complete search history.

(56) References Cited

U.S. PATENT DOCUMENTS

| | | | | |
|---|---|---|---|---|
| 6,182,092 | B1* | 1/2001 | Francis et al. ............ | 715/513 |
| 6,442,523 | B1* | 8/2002 | Siegel ..................... | 704/270 |
| 2002/0054090 | A1* | 5/2002 | Silva et al. ............... | 345/747 |
| 2002/0091524 | A1* | 7/2002 | Guedalia et al. .......... | 704/260 |
| 2002/0165955 | A1* | 11/2002 | Johnson et al. ........... | 709/224 |
| 2003/0023440 | A1* | 1/2003 | Chu ......................... | 704/249 |
| 2003/0046316 | A1* | 3/2003 | Gergic et al. ............. | 707/513 |

OTHER PUBLICATIONS

Mr. Cluey, How Can I find out how many hyperlinks there are on a page?, Sep. 10, 2000, <http://www.squtext.com/mr_cluey/countlinks.html>.*
FOLDOC, JavaServer Pages, Nov. 28, 1999, foldoc.org, <http://foldoc.doc.ic.ac.uk/foldoc/foldoc.cgi?query=JSP>.*
Jim A. Larson, Introduction and Overview of W3C Speech Inteface Framework, Dec. 2000, W3C, Working Draft 4, <http://www.w3.org/TR/voice-intro/>.*

* cited by examiner

*Primary Examiner*—Stephen Hong
*Assistant Examiner*—Joshua D Campbell
(74) *Attorney, Agent, or Firm*—Morgan, Lewis & Bockius LLP

(57) ABSTRACT

A system and method for dynamically translating a Hypertext Markup Language (HTML) document to Voice eXtensible Markup Language (VoiceXML) form includes a VoiceXML server for receiving a user request and, in response to the user request, making a Hypertext Transfer Protocol (HTTP) request, a VoiceXML session manager for receiving the HTTP request from the voice server and, in response to the HTTP request, accessing the HTML document, translating the HTML document to a VoiceXML document after performing document structure analysis (DSA) and text summarization (TS) of the HTML document and including user profile information with the VoiceXML document and sending the VoiceXML document to the voice server, so that the voice server can send the VoiceXML document to the user in an audible form.

21 Claims, 9 Drawing Sheets

Fig. 4

Nuance and Cisco Sign Multi-Year Agreement   Section 3

Cisco to Integrate Nuance Speech Recognition into AVVID Product Line

MENLO PARK, Calif., March 19, 2001 – Nuance (NASDAQ: NUAN), the leader in voice Web software, and Cisco Systems (NASDAQ: CSCO) today announced that they have entered into a multi-year agreement enabling Cisco to incorporate Nuance's market-leading speech recognition and voice authentication software into its Architecture for Voice, Video and Integrated Data (AVVID) products.

"Under the agreement, Cisco will integrate Nuance's speech software into its products to harness the power of human speech as part of its Internet Protocol based enterprise communication solutions, including Cisco's Call Manager and associated applications. The AVVID products are scheduled to launch in the second quarter 2001."

"This integration of Nuance's software is a clear endorsement of our technology, and is indicative of Nuance's leadership in providing leading edge technology to its customers," said Ronald Croen, president and CEO of Nuance. "Together, we'll help usher in the Voice Web generation."

NUANCE   Section 1

Products
Solutions
Services
Demos
Customers
Partners
Jobs

About Nuance sitemap
contact us

Fig. 5

Under the agreement, Cisco will integrate Nuance's speech software into its products to harness the power of human speech as part of its Internet Protocol-based enterprise communication solutions, including Cisco's Call Manager and associated applications. The AVVID products are scheduled to launch in the second quarter 2001.

SYSTEM AND METHOD FOR DYNAMICALLY TRANSLATING HTML TO VOICEXML INTELLIGENTLY

FIELD OF THE INVENTION

The present invention relates to a voice system and method for navigating the World Wide Web (Web) by dynamically translating Hypertext Markup Language (HTML) document to Voice eXtensible Markup Language (VoiceXML) form intelligently.

BACKGROUND OF THE INVENTION

VoiceXML is a Web-based industry-standard markup language that came out of a consortium of AT&T, IBM, Lucent and Motorola for building distributed Internet-based voice applications that enable Web authors and designers to create tags, similar to HTML. Whereas HTML assumes a graphical Web browser that appears on a display and that is controlled by using a keyboard and a mouse, VoiceXML assumes a voice browser with an audio input, which may comprise voice or keypad tones and an audio output, which may be computer-synthesized or recorded. VoiceXML is designed to create audio dialogs that feature synthesized speech, digitized audio, recognition of spoken and DTMF key input, recording of spoken input, telephony, and mixed-initiative conversations. Its major goal is to bring the advantages of Web-based development and content delivery to interactive voice response applications, and simplify these tasks.

Telephones have been important to the development of VoiceXML, although VoiceXML's appeal is not limited to use with telephones. FIG. 1 shows a conventional VoiceXML system that includes a VoiceXML browser 103 that runs on a specialized voice gateway node 102 that may be connected to a public switched telephone network (PSTN) 104 and to the Internet 105. VoiceXML browser 102 may include a VoiceXML interpreter context that may detect a call from a user of telephone 101, acquire a VoiceXML document and answer the call. Voice gateway nodes extend the power of the Web to the world's more than one billion telephones, from antique black candlestick telephones up to the latest mobile telephones. VoiceXML takes advantage of several trends: the growth of the Web and its capabilities, improvements in computer-based speech recognition and text-to-speech synthesis, and the accessibility of the Web from locations other than desktop computers.

Although advances have been made in converting HTML documents to VoiceXML form, such attempts have at best yielded limited semi-automated voice browsers. Even with current state-of-the-art voice browsers and voice portals, effective provisions for intelligently and dynamically converting HTML documents to VoiceXML form are lacking.

The first attempt in converting text information on a computer screen to speech was done by using screen readers. However, the techniques used by these screen readers failed to convey the structure of the document rendered on the screen. Other voice browsers, such as pwWebSpeak®, are suitable mainly for technically savvy users because of the browsers' complexity. Even though they are an improvement on screen readers, they only support telephone access by one user at a time, and use proprietary speech recognition technology that does not conform to any industry-wide voice standard like, for example, VoiceXML.

In recent years, various Web-related services have made improvements to voice browsers by providing voice portals that allow a user to dial in via telephones and access the Web. These improvements have been limited mainly to certain Web sites, such as Web search engines or sites with content related to, for example, finance, sports, weather and traffic. The services that provide these improvements include Web-On-Call®, WebGalaxy®, Tellme®, and BeVocal® portals. However, they provide access only to Web sites that have been manually pre-converted or re-authored into voice-enabled form such as VoiceXML. As a result of manual conversion, there are two versions of the same information, the Web site in HTML form and the VoiceXML document. If any information on the Web site changes after the manual conversion, such information will not be updated on the corresponding VoiceXML document. Thus, manual conversion suffers from problems of synchronization between the Web site and the VoiceXML document. What is needed is a VoiceXML-based solution that dynamically converts HTML into VoiceXML without the problems associated with existing services, and is also applicable to any Web site or Web page.

SUMMARY OF THE INVENTION

The present invention has been made in view of the above circumstances and is directed to a method and system that minimizes the limitations and disadvantages of conventional voice browsers and portals. The present invention provides a voice system that allows any telephone user to visit any Web site. The system dynamically translates an HTML document to VoiceXML form by incorporating HTML document structure analysis (DSA) using an earcons library, text summarization (TS), and expert systems techniques to enhance a user's navigation of Web sites and provide text summarization. While DSA enables a user to be informed of the type of Web site accessed, TS provides the user with a summary of the page in the form of an abstract or of key sentences from the text of the page. The system obviates the need for Web site owners to convert large volumes of HTML pages manually. A direct benefit of the system is the cost savings that result from eliminating the maintenance of voice representations on every HTML page on a Web site.

Additional features and advantages of the invention will be set forth in the description that follows, and in part will be apparent from the description, or may be learned by practice of the invention. The aspects, objects, uses, and other advantages of the invention will be realized and attained by the structure particularly pointed out in the written description and claims hereof as well as the appended drawings.

To achieve these and other advantages and in accordance with the purpose of the present invention, as embodied and broadly described, the system for dynamically translating HTML to VoiceXML in one aspect includes a voice server for receiving a user request and, in response to the user request, making a Hypertext Transfer Protocol (HTTP) request; and a voice session manager for receiving the HTTP request from the voice server and, in response to the HTTP request, accessing the HTML document, translating the HTML document to a VoiceXML document and sending the VoiceXML document to the voice server, so that the voice server can send the VoiceXML document to the user in an audible form.

Another aspect of the invention includes a method for dynamically translating an HTML document to VoiceXML form, comprising the steps of making an HTTP request in response to a request by a user; accessing the HTML document in response to the HTTP request; translating the HTML document to a VoiceXML document; and sending the VoiceXML document to the user in an audible form.

Yet another aspect of the invention is to provide the DSA of a Web page. DSA entails Web page segmentation using a graph theory technique, which identifies the text, form, and navigation sections of a Web page and computes a feature vector of each section. This information provides the user with the choice of accessing different types of sections or regions of the Web page, thus enabling the user to skip irrelevant regions of the Web page and providing the effect of scanning of the Web page.

Yet another aspect of the invention is to include TS of text sections identified by the DSA method. TS is available in two forms: (1) important text highlights, which allow the user to navigate to corresponding text regions or paragraphs, and (2) an abstract, which is an aggregation of the most important clauses or sentences of the text.

Yet another aspect of the invention is to provide the ability to extract text from graphics included on a Web page. These graphics may be in the form of icons or image maps. The facility of extracting text from graphics on a Web page is a significant addition to the facility of extracting text from text sections of the Web page. The extracted text may identify names of elements, such as text fields and combination boxes, of an HTML form.

Yet another aspect of the invention is to provide a facility for converting HTML forms into a VoiceXML equivalent by a combination of menus and fields. There are two types of dialogs: forms and menus. A field may be, for example, an input field. The user may provide a value for the field before proceeding to the next element in the form. Forms present information and gather input; menus offer choices of what to do next.

Yet another aspect of the invention is to provide a facility for a user to access Web sites securely. The system may accomplish secure access by supporting a Secure Sockets Layer (SSL) or Hypertext Transfer Protocol Secure (HTTPS) connections and providing session cookie management.

Yet another aspect of the invention to produce an aesthetically enhanced VoiceXML document. The system may combine the use of multiple voices and earcons to make structural elements of the Web page audible to the listener.

Yet another aspect of the invention is to provide a profile of a user through a personalization framework. This facility may allow the user to retrieve preferences such as bookmarks to other Web sites together with authentication information needed to visit such Web sites if they happen to be secure sites. Graphic User Interface (GUI) tools may be provided to allow a user or an administrator of the system to edit supporting information for visiting certain sites. For example, a user can set up e-mail profile information including username and password information to connect to a service provider's e-mail system. The present invention may also support voice authentication, which obviates the need for a user of the system to type in their username and passwords.

Reference will be made in detail to the preferred embodiments of the present invention, examples of which are illustrated in the accompanying drawings.

BRIEF DESCRIPTION OF THE DRAWINGS

The accompanying drawings, which are incorporated in and constitute a part of this specification, are included to provide further understanding of the invention, to illustrate embodiments of the invention, and, together with the description, to serve to explain the principles of the invention. In the drawings:

FIG. 4 illustrates an example of a segmented Web page in accordance with the present invention.

FIG. 5 illustrates an example of a navigation Web page in accordance with the present invention.

FIG. 6 illustrates an example of a text summary (TS) of the content Web page in FIG. 3 in accordance with the present invention.

DETAILED DESCRIPTION OF THE DRAWINGS

Figure 1:
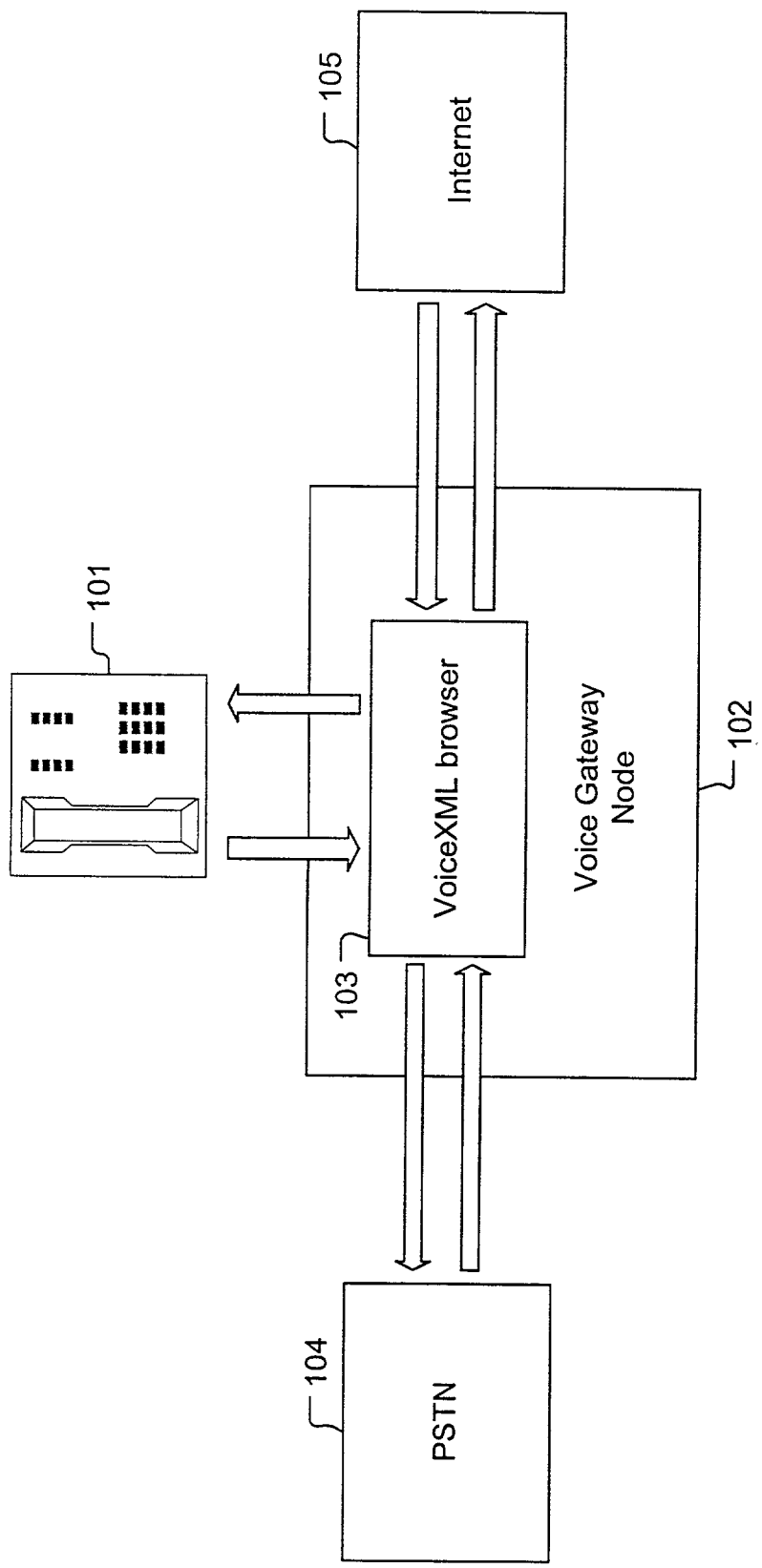
FIG. 1 illustrates a schematic view of a conventional VoiceXML system.
Figure 2:
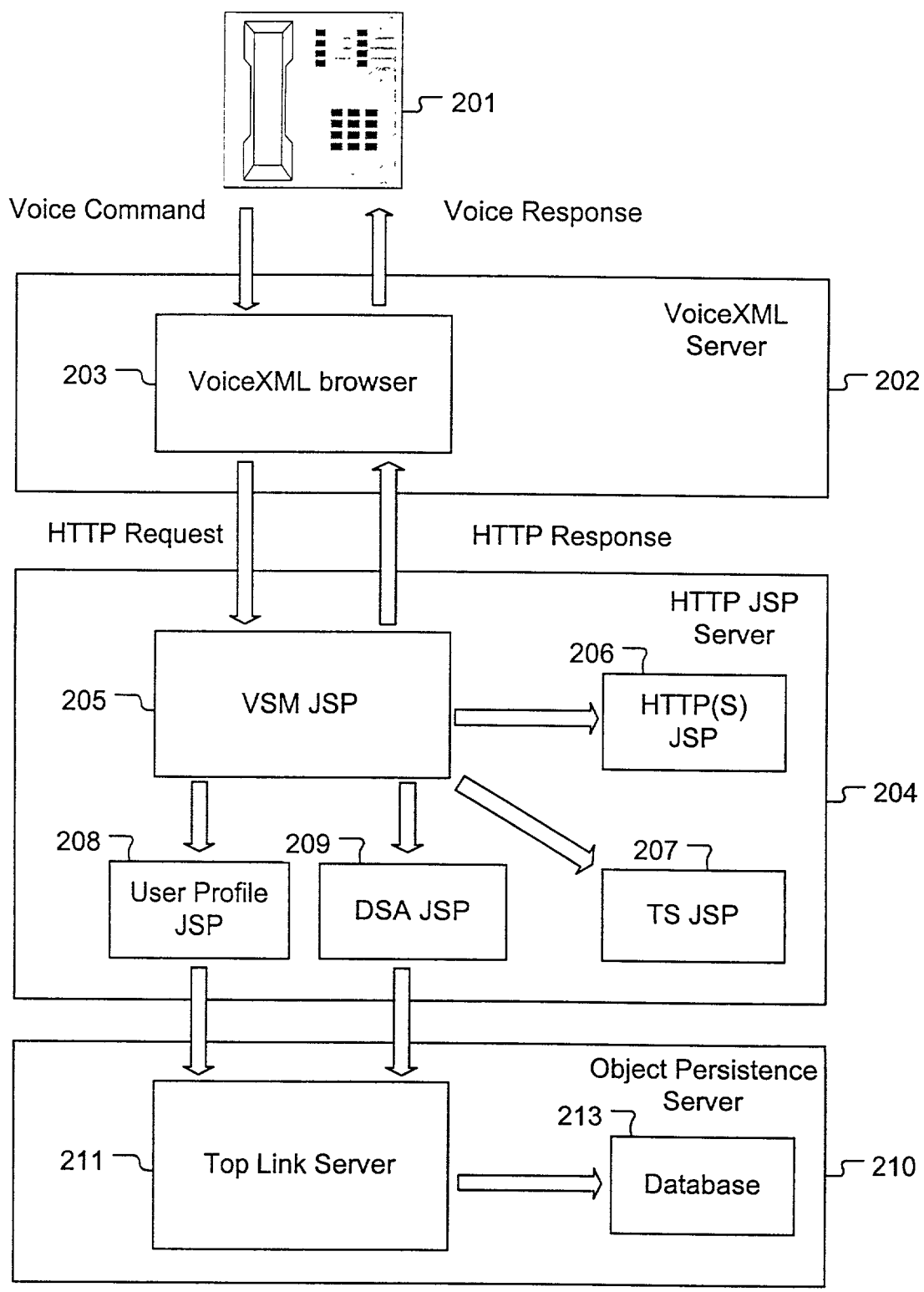
FIG. 2 illustrates a schematic view of an exemplary high-level architecture of the HTML-to-VoiceXML system in accordance with the present invention.

FIG. 2 shows a schematic view of an exemplary high-level architecture of the inventive HTML-to-VoiceXML system. FIG. 2 is not intended to show all possible components of the HTML-to-VoiceXML system, and those skilled in the art will appreciate that the HTML-to-VoiceXML system may include additional elements that are within the scope of the invention. When a user makes a phone call from telephone 201 into the system, the VoiceXML server 202 together with an audio provider may convert the call into digital content that conforms to the H.323 standard. The audio provider may be a device driver in the form of a card or other hardware that translates analog signals from telephone 201 to digital signals. H.323 is the international standard and the market leader for IP and has proven to be an extremely scalable solution that meets the needs of both service providers and enterprises.

VoiceXML browser 203 may create the H.323 session and may be based on, for example, a Nuance Voyager platform. Other platforms will be known to those skilled in the art and are within the scope of the present invention. VoiceXML browser 203 may load a default starting VoiceXML document and send a corresponding audio rendition back to the user in the form of an analog telephone signal. At this point, the VoiceXML browser 203 may form a Universal Resource Locator (URL) and make a Hypertext Transfer Protocol (HTTP) request to the VoiceXML Session Manager Java Server Page (VSM JSP) 205 in HTTP JSP server 204 for authentication. HTTP JSP server 204 may be in a Web layer and may service all the HTTP requests. VSM JSP 205 is a session manager on the Web server side that handles requests on behalf of the user. VSM JSP 205 may also call HTTPS JSP 206, if the target Web site is secure. A typical example that requires secure Web site access is a shopping cart scenario where a user adds items into a shopping cart, stops and goes off to visit other Web sites, and comes back to the original Web site to check out the items. In this scenario, if the user provides sensitive information such as credit card numbers, then she should not have to resubmit such information. The session manager on the Web server of the system may keep track of session information including SSL authentication information, namely a session cookie.

Upon receiving an HTTP or HTTPS request, HTTP JSP server 204 may spawn a VSM JSP session or thread that has a unique session identity (session ID). VSM JSP 205 may remain active for the life of the phone call, and every subsequent HTTP(S) request specific to this phone call may contain the mentioned unique VSM session ID. If the user is authenticated, VSM JSP 205 may load user personalization information that includes user preferences such as earcons used for voice rendition, language for commands and a listing of most visited Web sites or bookmarks. VSM JSP 205 may then create a corresponding VoiceXML document and send it to VoiceXML browser 203 in response to the original HTTP(S) request connection. If the user is not authenticated, VSM JSP 205 may create the returned VoiceXML document from a "guest" profile retrieved from database 213 in object persistence server 210, which may store other user information and support object persistence.

VoiceXML browser 203 browser may then offer the user a number of options, such as the option of accessing a bookmarked Web site, checking e-mail, or interacting with a home page. When the user chooses an option, VoiceXML browser 203 may dynamically form a URL and then make another HTTP(S) request with a session ID of the previous request. On the Web server side, VSM JSP 205 may handle the request by first calling the HTTP(S) client. If the call by VSM JSP 205 fails by, for example, a time out or page not found indication, then VSM JSP 205 may create a VoiceXML error message, and return it to VoiceXML browser 203. Otherwise, VSM JSP 205 may return one or more VoiceXML messages indicating the current status of the request to VoiceXML browser 203 until the whole content of the URL is downloaded. VSM JSP 205 may then call an HTML parser that fixes ill-formed HTML and then dynamically convert the HTML to a Java representation.

VSM JSP 205 may then call Document Structure Analyzer JSP (DSA JSP) 209, which contains a DSA library that uses a Java representation of a Web page as a parameter. DSA JSP 209 may use a density metric calculation algorithm to create an abstract template representation (ATR), or feature vector, of the eXtensible Markup Language (XML) document of the target Web page. DSA JSP 209 may perform Web page segmentation using a graph theory technique, which may identify the content and navigation sections of a Web page and compute a feature vector of each section. Content sections contain mostly text while navigation sections contain mostly hyperlinks. The feature vector of a section may be related to the link density of the section, the size of the page, the number of links pointing to the same page, and how the page relates to other pages that point to it by links.

The link density may be based upon an aggregate of a number of previous studies of Web pages and calculated by the following equation: $D_1=(H_c-KI_1)/S_c$, where $H_c$ is the number of non-tag characters in the section that appears inside $H_{REF}$, a link tag in html, K is a weight value equal to about 5, $I_1$ is the number of links within image maps in the section, and $S_c$ is the total number of non-tag characters in the section. If the link density is greater than 0.75, for example, then the section may be a navigation section; otherwise, the section may be a content section.

Figure 3:
FIG. 3 illustrates an example of a content Web page in accordance with the present invention.
Figure 5:
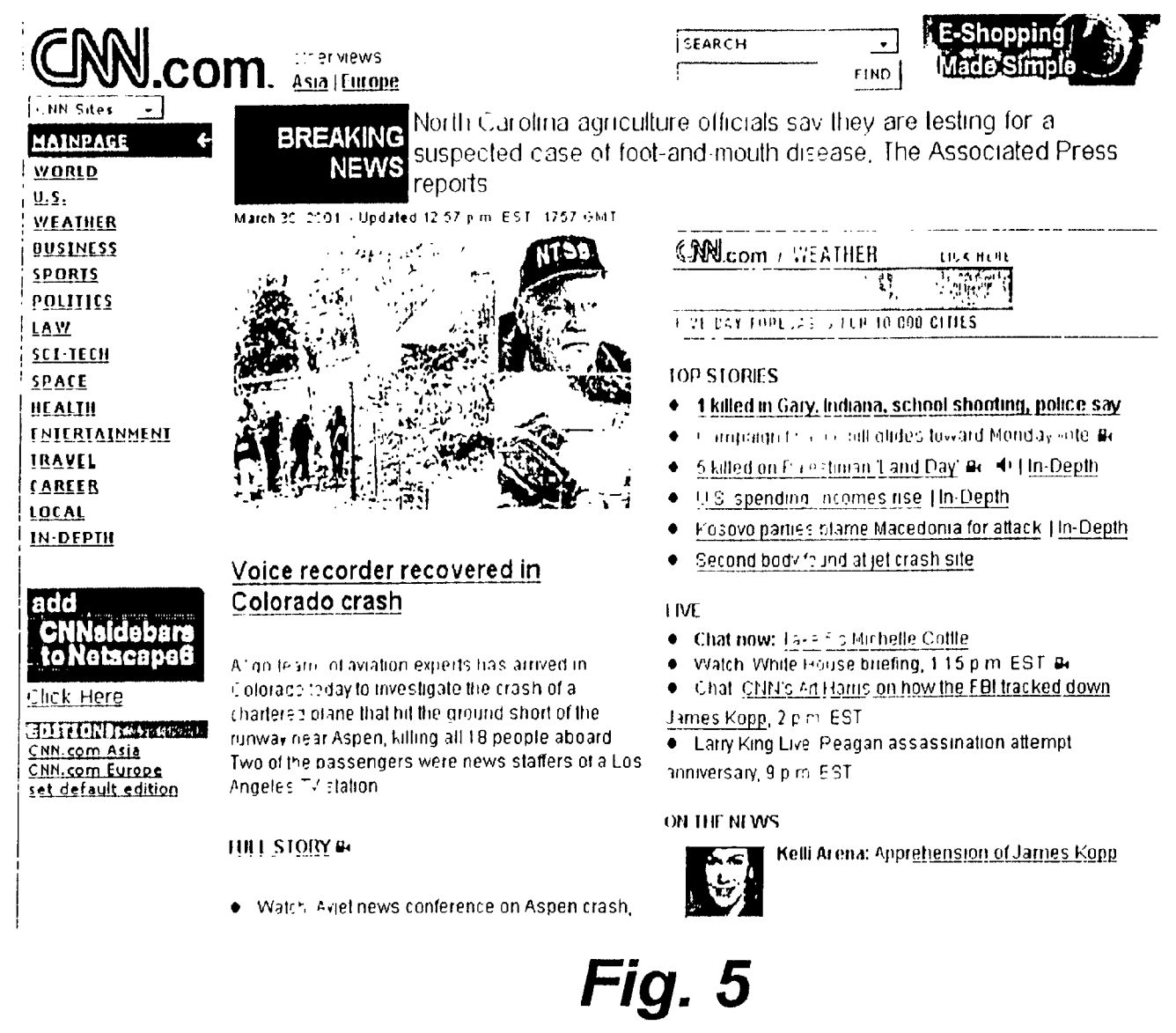

Before performing web page segmentation, DSA JSP 209 may check object persistence server 210 for the existence of a previously created ATR for the Web page, if it is a simple URL with no parameters. The ATR may already include information such as whether the Web page is a navigation page or a content page. If the target Web page has frames, then the ATR may contain sub elements that contain information also specific to each frame in the frame set. FIG. 3 illustrates a content page with a link density of about 0.07, and FIG. 5 illustrates a navigation page with a link density of about 0.75. These thresholds for the link densities of the content and navigation pages may be user defined. For example, the user may define a default link density of 0.75 for a navigation page to indicate that more than three quarters of text in the page is in the hyperlinks. The ATR may also contain several lists of links, each of which is ordered by anchor significance, which is determined by anchor name, anchor name length, font size, and the underlining of the anchor name.

DSA JSP 209 may also partition the Web page into sections that are either navigation sections or content sections. Such partitioning may be important especially if the page is not well-formed. DSA JSP 209 may partition the page in such a manner that the number of sections is not excessive and then summarize the most important parts of the sections. Partitioning may be accomplished by using a pattern recognition technique of split-and-merge using region growing. That is, an HTML page may be split into basic elements, most of which are table cells. Region growing of larger cells is then carried out by merging similar smaller neighboring cells to the target cell. This may be done for the convenience of the user so that the user will not be bombarded with unnecessary information. When possible, sections may be given names and two types of earcons may be used to differentiate between navigation sections and content sections. All of the section feature information also may be contained in the resulting ATR for the page. This information provides the user with the choice of accessing different types of sections or regions of the Web page, thus enabling the user to skip irrelevant regions of a Web page and providing the effect of scanning of a Web page. FIG. 4 depicts how DSA JSP 209 segments the Web page shown in FIG. 3 into a first navigation section 401, a second navigation section 402 and a content section 403. Essentially each section has its corresponding ATR within a larger ATR XML document.

DSA JSP 209 may provide the ability to extract text from graphics included on a Web page. These graphics may be in the form of icons or image maps. The extracted text may identify names of elements, such as text fields and combination boxes, of an HTML form. The extraction of text from graphics may be accomplished by utilizing Optical Character Recognition (OCR) libraries such as TextBridge®.

DSA JSP 209 may also provide the ability to convert HTML forms into a VoiceXML equivalent by a combination of menus and fields. There are two types of dialogs: forms and menus. A field may be, for example, an input field. The user may provide a value for the field before proceeding to the next element in the form. Forms present information and gather input; menus offer choices of what to do next. The complexity of HTML forms ranges from simple text fields and list boxes to JavaScript functions. HTML text fields are mapped to fields in VoiceXML. HTML lists are mapped to VoiceXML menus; and HTML check boxes are mapped to a sequence of 'yes' or 'no' dialogs in VoiceXML.

The user may have the option of specifying a compression rate, p, that indicates the percentage of most important clauses or sentences generated, where 1 p 100. The default percentage may be at p=20. The user also may have the option of either listening to all generated important clauses or sentences or selecting a text block or paragraph from which such a clause or sentence was extracted. Which type of summary is done depends on the user preferences or default preferences if the user has none. FIG. 6 illustrates an example of a text summary of a content Web page.

If the page or frame of the page is a content section containing substantial text, VSM JSP 205 may make a conditional call to TS JSP 207, which contains a TS library of the page or frame of the page from highlights of the text or an abstract of the text. TS JSP 207 may contain, for example, a Marcu summarizer, which is a discourse-based TS that uses non-semantic computational structures for text summarization that is both general enough to be applicable to naturally occurring texts and concise enough to facilitate an algorithmic approach to discourse analysis. This method of TS may assemble discourse structure representations based on units at the level of a phrase, clause or sentence. TS may provide important text highlights that allow a user to navigate to corresponding text regions or paragraphs, or an abstract containing the most important clauses or sentences of the text.

Upon completion of the translation, the VSM JSP 205 may create a VoiceXML representation of results of the page analysis and TS. This result may be cached for subsequent use. VSM JSP 205 may use an earcon library that is stored in the database to accent anchors and images in the text being rendered back to the user, with different earcons selectively used to differentiate between a navigation page or section and a content page or section.

VSM JSP 205 may call user profile JSP 208 to interpret object information that is stored in database 213, which may contain user specific and profile information, such as voice authentication information, preferences such as bookmarks, a list of favorite sites, e-mail account information including usernames and passwords and even information on the method of reading data to users. For example, when users visit a Web page and request that a certain segment be read back to them, certain default options may be provided for them under a personalization framework, such as having blocks of text summarized. Object persistence server 210 may alternate between relational information, such as data stored in database 213 and an object representation of that information. For example, the "concept" of a user may be an object in database 213. However, the object may also be represented in a table in database 213. Thus, if a Web service attempts to obtain user specific or profile information, it may access and read this information from database 213 into an object representation.

Figure 7:
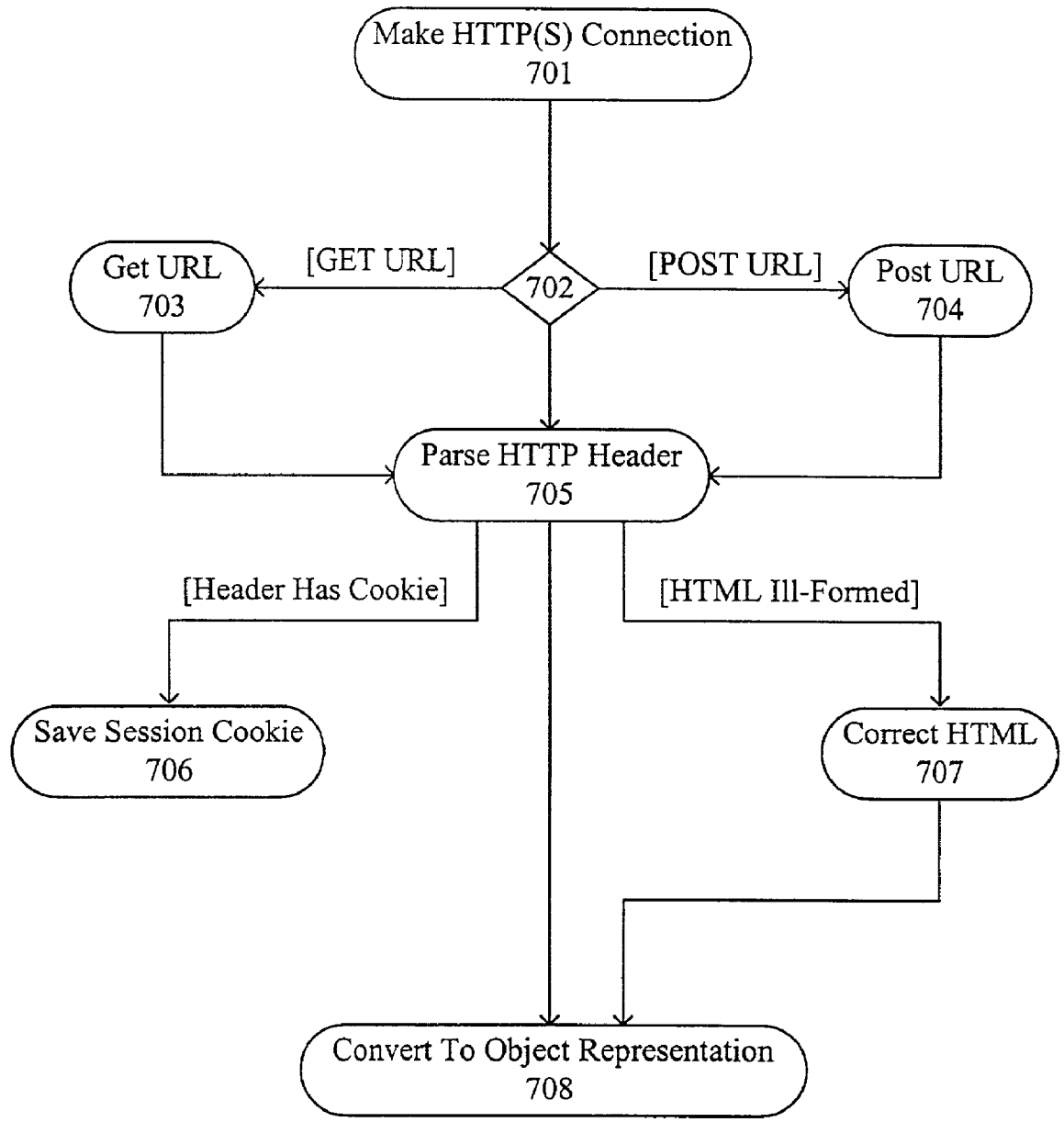
FIG. 7 illustrates a flow diagram depicting a process for parsing and fixing a Web page in accordance with the present invention.

After TS JSP 207 summarizes the content sections, VSM JSP 205 may translate the content sections, which are in HTML form, to corresponding VoiceXML representations. The translation may utilize a voice-user interface design approach, where any generic form of HTML structure is translated in such a manner that the user is able to interact with the section or page. FIG. 7 illustrates a flow diagram depicting how VSM JSP 205 calls an HTML parser that parses and fixes a Web page. At step 701, VSP JSP 205 may make an HTTP(S) connection, the URL of the Web page may be obtained in step 703 or posted in step 704 after decision step 702, based on whether the HTTP request is a "get" request or a "post" request, respectively. The HTTP header may be parsed is step 705. If the HTTP header has a session cookie, then the session cookie may be saved in step 706. If the HTML is ill-formed, then the HTML may be corrected in step 707. Finally, the HTTP header may be converted to object representation in step 708.

Figure 8:
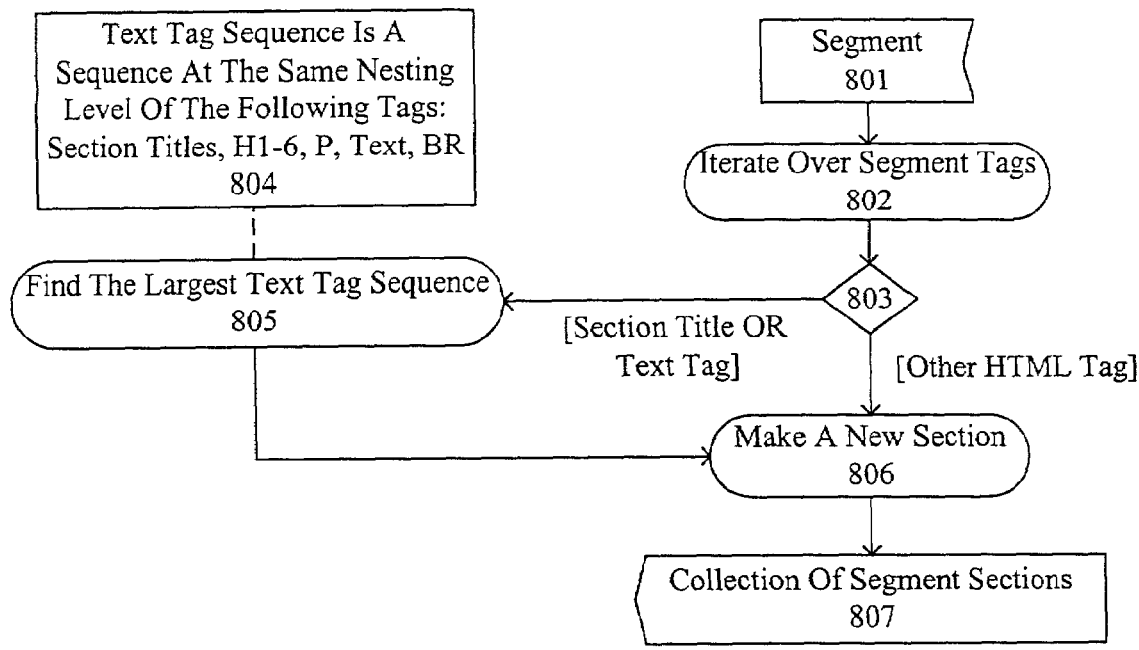
FIG. 8 illustrates a flow diagram depicting a process for creating text sections from a segment in accordance with the present invention.

FIG. 8 illustrates a flow diagram depicting a process carried out by DSA JSP 209 for creating text sections from a segment. Segment 801 may be taken from a Web page, tags created by the author of the Web page may be processed in step 802 and stand-alone text blocks may be searched. Certain tag sequences may include the following tags: sections titles, H1 to H6, paragraphs P, stand-alone text and paragraph breaks BR as shown in block 804. If segment 801 includes a section title or text tag, decision step 803 may direct the process to find the largest text tag sequence in step 805. If segment 801 includes other HTML tags, the process may make a new section in step 806 and the segment sections may be collected in step 807. The text sections may be summarized by calling TS JSP 207 for each one of the text sections with a segment.

Figure 9:
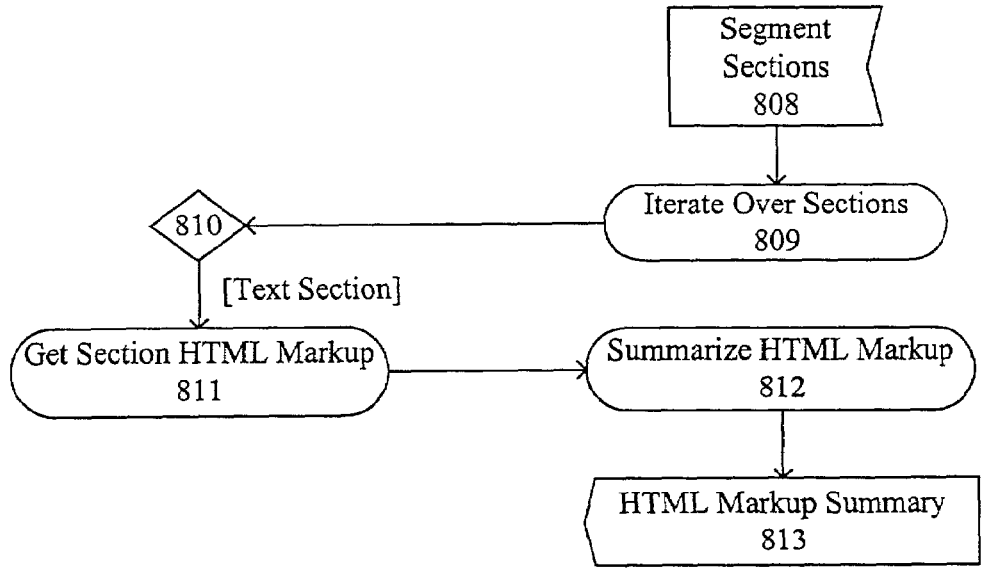
FIG. 9 illustrates a flow diagram depicting a process for summarizing text sections in collected segment sections in accordance with the present invention.

FIG. 9 illustrates a process carried out by TS JSP 207 for summarizing the text sections in the collected segment sections. The segment sections 808 may be then processed one at a time in step 809. If decision step 810 encounters a text section, then the HTML markup may be retrieved in step 811, and summarized in step 812 to form an HTML markup summary 813 and HTML markup object structure 814.

Figure 10:
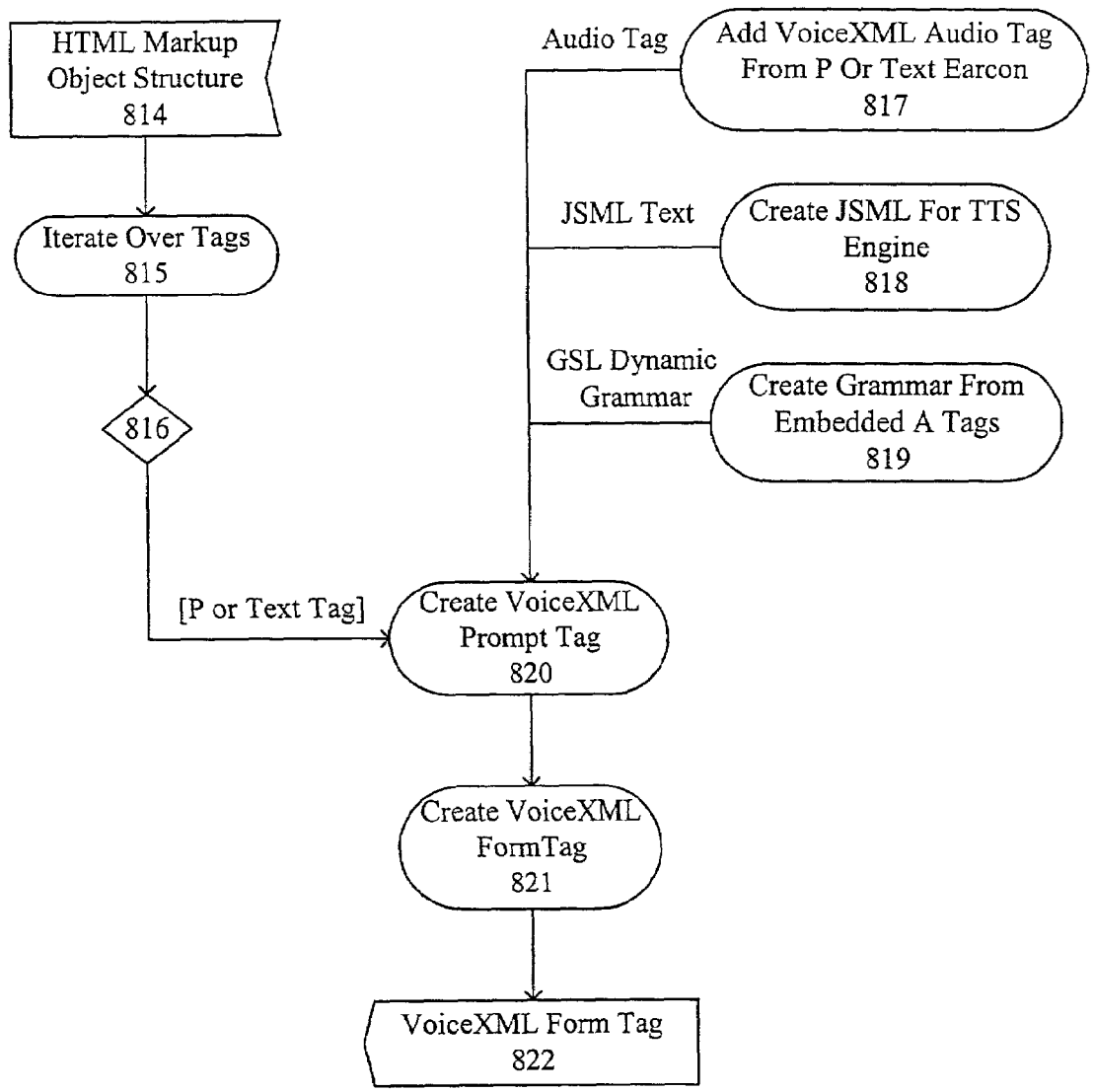
FIG. 10 illustrates a process for translating text sections into VoiceXML in accordance with the present invention.

FIG. 10 illustrates a process carried out by VSM JSP 205 for translating the text sections into VoiceXML. After object structure 814 is inputted, the process may process one tag at a time in step 815 and if decision step 816 encounters a P or text tag, a VoiceXML prompt tag may be created. Any text that is sent back to the user may be sent to a text-to-speech (TTS) engine that the voice platform supports. Thus, VoiceXML prompts may be sent to the TTS engine by VoiceXML browser 203 and only audible information comes back to the user. A VoiceXML audio tag from a P or text earcon may be added in step 817, Java Speech Markup Language (JSML) text for the TTS engine may be created in step 818, and grammar speech language (GSL) dynamic grammars from embedded tags may be created in step 819. Many TTS engines support JSML. For any construct in HTML, a user may receive an earcon or audible tone that may, for example, be specific to a text region of a Web page. When a TTS engine generates audio information, it may produce an earcon informing the user that text will be read back to the user. The P or text tags are hyperlinks. GSL dynamic grammars may be created at the preprocessing stage to allow a user's commands to be understood. Whenever the hyperlinks exist, dynamic grammars may be generated so that the user can make commands to visit those hyperlinks. When the audio tags, JSML text, and dynamic grammars are created and a P or text tag is identified, the VoiceXML prompt tag may be created in step 820, and the VoiceXML form tag may be created in step 821 to produce VoiceXML form 822. At this point, the translation to VoiceXML will be complete.

Those skilled in the art will appreciate that various modifications can be made in the present invention without departing from the spirit or scope of the invention. Thus, it is intended that the present invention cover the modifications and variations of this invention provided they come within the scope of the appended claims and their equivalents.

What is claimed is:

1. A system for dynamically translating a Hypertext Markup Language (HTML) document to Voice eXtensible Markup Language (VoiceXML) form comprising:
   a voice server for receiving a user request and, in response to the user request, making a Hypertext Transfer Protocol (HTTP) request;
   a voice session manager for receiving the HTTP request from the voice server and, in response to the HTTP request, accessing the HTML document, translating the HTML document to a VoiceXML document and sending the VoiceXML document to the voice server, so that the voice server can send the VoiceXML document to the user in an audible form; and a document structure analyzer java server page (DSA JSP) for partitioning the HTML document into a plurality of text sections and a plurality of link sections;

wherein the DSA JSP differentiates between the plurality of text sections and the plurality of link sections by calculating a link density D1 of a section, where the section may be a link section if the link density D1 is greater than about 0.75, or otherwise the section may be a text section;

wherein the link density D1 is given by equation D1= (Hc−KIl)/Sc, where Hc is a number of non-tag characters in a section that appears inside HREF, a link tag in html, K is a weight value equal to about 5, I1 is a number of links within image maps in the section, and Sc is a total number of non-tag characters in the section.

2. The system for dynamically translating an HTML document to VoiceXML form according to claim 1, further comprising a text summarization java server page (TS JSP) for performing summarization of the plurality of text sections of the HTML document.

3. The system for dynamically translating an HTML document to VoiceXML form according to claim 2, wherein the TS JSP provides text highlights or an abstract that contains important clauses or sentences from the plurality of text sections.

4. The system for dynamically translating an HTML document to VoiceXML form according to claim 1, wherein a plurality of earcons are provided for the user to differentiate between the plurality of text sections and the plurality of link sections.

5. The system for dynamically translating an HTML document to VoiceXML form according to claim 1, further comprising a user profile java server page for interpreting user profile information stored in a database.

6. The system for dynamically translating an HTML document to VoiceXML form according to claim 5, wherein the user profile information includes one or more of authentication information, bookmarks, a list of favorite sites, e-mail account information and user default options.

7. The system for dynamically translating an HTML document to VoiceXML form according to claim 1, wherein the voice session manager calls an HTML parser that parses and corrects the HTML document.

8. A method for dynamically translating an HTML document to VoiceXML form, comprising the steps of:
   making an HTTP request in response to a request by a user;
   accessing the HTML document in response to the HTTP request;
   translating the HTML document to a VoiceXML document; and
   sending the VoiceXML document to the user in an audible form; and
   partitioning the HTML document into a plurality of text sections and a plurality of link sections;
   wherein the plurality of text sections and the plurality of link sections are differentiated by calculating a link density D1 of a section, where the section may be a link section if the link density D1 is greater than about 0.75, or otherwise the section may be a text section;
   wherein the link density D1 is given by the equation D1=(Hc−KII)/Sc, where He is a number of non-tag characters in a section that appears inside HREF, a link tag in html, K is a weight value equal to about 5, I1 is a number of links within image maps in the section, and Sc is a total number of non-tag characters in the section.

9. The method for dynamically translating an HTML document to VoiceXML form according to claim 8, further comprising the step of performing summarization of the plurality of text sections of the HTML document.

10. The method for dynamically translating an HTML document to VoiceXML form according to claim 8, further comprising the step of providing text highlights or an abstract that contains important clauses or sentences from the plurality of text sections.

11. The method for dynamically translating an HTML document to VoiceXML form according to claim 8, further comprising the step of:
   providing a plurality of earcons for the user to differentiate between the plurality of text sections and the plurality of link sections.

12. The method for dynamically translating an HTML document to VoiceXML form according to claim 8, further comprising the steps of:
   extracting a segment from the HTML document, the segment including a plurality of tag sequences;
   processing the plurality of tag sequences;
   finding the largest tag sequence of the plurality of tag sequences, if the plurality of tag sequences are section titles or text tags; and
   forming a plurality of segment sections, if the plurality of tag sequences are not section titles or text tags; and
   collecting the plurality of segment sections.

13. The method for dynamically translating an HTML document to VoiceXML form according to claim 12, further comprising the steps of:
   processing the plurality of segment sections;
   obtaining an HTML markup of a segment section if the segment section is a text section;
   summarizing the HTML markup of the segment section; and
   forming an HTML markup object structure from the summarized HTML markup.

14. The method for dynamically translating an HTML document to VoiceXML form according to claim 8, further comprising the step of interpreting user profile information.

15. The method for dynamically translating an HTML document to VoiceXML form according to claim 14, wherein the user profile information includes one or more of authentication information, bookmarks, a list of favorite sites, e-mail account information and user default options.

16. The method for dynamically translating an HTML document to VoiceXML form according to claim 8, further comprising the steps of:
   making an HTTP connection and accessing a universal resource allocator (URL);
   parsing an HTTP header of the HTML document;
   correcting the HTML document if HTML is ill-formed; and
   converting the HTML document to object representation.

17. A method for dynamically translating an HTML document to VoiceXML form, comprising the steps of:
   making an HTTP request in response to a request by a user;
   accessing the HTML document in response to the HTTP request;
   translating the HTML document to a VoiceXML document;

sending the VoiceXML document to the user in an audible form;
partitioning the HTML document into a plurality of text sections and a plurality of link sections;
extracting a segment from the HTML document, the segment including a plurality of tag sequences;
processing the plurality of tag sequences;
finding the largest tag sequence of the plurality of tag sequences, if the plurality of tag sequences are section titles or text tags;
forming a plurality of segment sections, if the plurality of tag sequences are not section titles or text tags; and collecting the plurality of segment sections;
processing the plurality of segment sections;
obtaining an HTML markup of a segment section if the segment section is a text section;
summarizing the HTML markup of the segment section;
forming an HTML markup object structure from the summarized HTML markup; and
further comprising the steps of:
processing a plurality of tags in the HTML markup object structure;
adding a VoiceXML audio tag from a paragraph or text earcon;
creating java speech markup language (JSML) text for a text-to-speech (TTS) engine;
creating a grammar from embedded tags;
creating a VoiceXML prompt tag if a tag among the plurality of tags is a paragraph tag or a text tag; and
creating a VoiceXML form tag.

18. A system for dynamically translating a Hypertext Markup Language (HTML) document to Voice eXtensible Markup Language (VoiceXML) form comprising:
a voice server for receiving a user request and, in response to the user request, making a Hypertext Transfer Protocol (HTTP) request;
a voice session manager for receiving the HTTP request from the voice server and, in response to the HTTP request, accessing the HTML document, translating the HTML document to a VoiceXML document and sending the VoiceXML document to the voice server, so that the voice server can send the VoiceXML document to the user in an audible form;
a document structure analyzer java server page (DSA JSP) for partitioning the HTML document into plurality of text sections and a plurality of link sections;
a text summarization java server page (TS JSP) for performing summarization of the plurality of text sections of the HTML document; and
a user profile java server page for interpreting user profile information stored in a database, including one or more of authentication information, bookmarks, a list of favorite Web sites, e-mail account information and user default options;
wherein the DSA JSP differentiates between the plurality of text sections and the plurality of link sections by calculating a link density $D1$ of a section, where the section may be a link section if the link density $D1$ is greater than about 0.75, or otherwise the section may be a text section;
wherein the link density $D1$ is given by the equation $D1=(Hc-KIi)/Sc$, where $Hc$ is a number of non-tag characters in a section that appears inside HREF, a link tag in html, $K$ is a weight value equal to about 5, $Ii$ is a number of links within image maps in the section, and $Sc$ is a total number of non-tag characters in the section.

19. The system for dynamically translating an HTML document to VoiceXML form according to claim 18, wherein a plurality of earcons are provided for the user to differentiate between the plurality of text sections and the plurality of link sections.

20. The system for dynamically translating an HTML document to VoiceXML form according to claim 18, wherein the TS JSP provides text highlights or an abstract that contains important clauses or sentences from the plurality of text sections.

21. The system for dynamically translating an HTML document to VoiceXML form according to claim 18, wherein the voice session manager calls an HTML parser that parses and corrects the HTML document.

* * * * *